(12) United States Patent
Neogi

(10) Patent No.: US 8,968,093 B2
(45) Date of Patent: Mar. 3, 2015

(54) DYNAMIC INSERTION OF PERSONALIZED CONTENT IN ONLINE GAME SCENES

(75) Inventor: Raja Neogi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1954 days.

(21) Appl. No.: 10/892,940

(22) Filed: Jul. 15, 2004

(65) Prior Publication Data

US 2006/0014585 A1  Jan. 19, 2006

(51) Int. Cl.
| | | |
|---|---|---|
| A63F 13/12 | (2006.01) | |
| G06F 21/10 | (2013.01) | |
| A63F 13/30 | (2014.01) | |
| H04N 21/234 | (2011.01) | |
| H04N 21/2343 | (2011.01) | |
| H04N 21/258 | (2011.01) | |
| H04N 21/43 | (2011.01) | |
| H04N 21/458 | (2011.01) | |
| H04N 21/478 | (2011.01) | |
| H04N 21/8547 | (2011.01) | |

(52) U.S. Cl.
CPC .......... *A63F 13/12* (2013.01); *H04N 21/23412* (2013.01); *H04N 21/234318* (2013.01); *H04N 21/25891* (2013.01); *H04N 21/4307* (2013.01); *H04N 21/458* (2013.01); *H04N 21/4781* (2013.01); *H04N 21/8547* (2013.01); *A63F 2300/50* (2013.01); *A63F 2300/552* (2013.01); *A63F 2300/5546* (2013.01)
USPC ................... 463/42; 705/51; 705/57; 705/14

(58) Field of Classification Search
USPC ................ 463/42, 43, 1–2, 4–5, 7–8, 30–34, 463/36–39, 49–57; 273/317.1, 340, 348, 273/361–367; 705/14, 26–27, 59, 14.1; 717/168–178
See application file for complete search history.

(56) References Cited

U.S. PATENT DOCUMENTS

| | | | | |
|---|---|---|---|---|
| 5,938,530 | A | * | 8/1999 | Watanabe ........................ 463/31 |
| 5,947,823 | A | * | 9/1999 | Nimura .......................... 463/32 |
| 6,021,426 | A | * | 2/2000 | Douglis et al. ................ 709/200 |
| 6,026,368 | A | * | 2/2000 | Brown et al. ................... 705/14 |
| 6,036,601 | A | | 3/2000 | Heckel |
| 6,144,375 | A | * | 11/2000 | Jain et al. ................... 715/500.1 |
| 6,373,508 | B1 | * | 4/2002 | Moengen ...................... 715/848 |

(Continued)

FOREIGN PATENT DOCUMENTS

| | | |
|---|---|---|
| CN | 1146781 | 4/2004 |
| EP | 0 877 314 A1 | 11/1998 |
| EP | 1067470 A | 1/2001 |

OTHER PUBLICATIONS

U.S. Appl. No. 10/992,394, filed Nov. 17, 2004; Inventor: Bhatt et al.

(Continued)

*Primary Examiner* — Pierre E Elisca
(74) *Attorney, Agent, or Firm* — Trop, Pruner & Hu, P.C.

(57) ABSTRACT

Apparatus, systems and methods for the dynamic insertion of personalized content in online game scenes are disclosed. In one implementation, a content engine may swap a dynamic media object received from a game server for a static media object at least partly in response to a time stamp associated with the dynamic media. The content engine may then provide the dynamic media object to a game engine.

9 Claims, 4 Drawing Sheets

(56) References Cited

U.S. PATENT DOCUMENTS

| | | | |
|---|---|---|---|
| 6,468,161 B1* | 10/2002 | Shimomura | 463/43 |
| 6,477,575 B1* | 11/2002 | Koeppel et al. | 709/224 |
| 6,709,335 B2* | 3/2004 | Bates et al. | 463/42 |
| 7,007,295 B1* | 2/2006 | Rose et al. | 725/86 |
| 7,039,048 B1 | 5/2006 | Monta et al. | 370/389 |
| 7,054,928 B2* | 5/2006 | Segan et al. | 709/225 |
| 7,069,274 B2* | 6/2006 | Stern | 707/104.1 |
| 7,076,445 B1* | 7/2006 | Cartwright | 705/14 |
| 7,346,843 B2* | 3/2008 | Hind et al. | 715/234 |
| 7,360,160 B2* | 4/2008 | Matz | 715/716 |
| 2002/0044567 A1 | 4/2002 | Voit et al. | |
| 2002/0052229 A1* | 5/2002 | Halliburton et al. | 463/9 |
| 2002/0065136 A1 | 5/2002 | Day | |
| 2002/0082077 A1* | 6/2002 | Johnson et al. | 463/30 |
| 2002/0147047 A1* | 10/2002 | Letovsky et al. | 463/42 |
| 2002/0162109 A1* | 10/2002 | Shteyn | 725/87 |
| 2003/0130020 A1* | 7/2003 | Bates et al. | 463/1 |
| 2003/0130040 A1* | 7/2003 | Dripps | 463/42 |
| 2003/0158780 A1* | 8/2003 | Isobe et al. | 705/14 |
| 2004/0073916 A1* | 4/2004 | Petrovic et al. | 725/18 |
| 2004/0248631 A1* | 12/2004 | Hirai | 463/4 |
| 2004/0261099 A1* | 12/2004 | Durden et al. | 725/32 |
| 2005/0038753 A1* | 2/2005 | Yen et al. | 705/59 |
| 2005/0138664 A1 | 6/2005 | Neogi | |
| 2005/0149965 A1 | 7/2005 | Neogi | |
| 2005/0193426 A1 | 9/2005 | Neogi | |
| 2005/0262529 A1 | 11/2005 | Neogi et al. | |
| 2005/0278733 A1 | 12/2005 | Neogi | |

OTHER PUBLICATIONS

U.S. Appl. No. 10/868,296, filed Jun. 14, 2004; Inventor: Neogi et al.
U.S. Appl. No. 10/976,428, filed Oct. 29, 2004; Inventor: Neogi et al.
European Patent Office, European Office Action for corresponding European Application No. 05764553.3, 4, pages, May 23, 2008.
D4="MPEG-4 based framework for game engines to handle virtual advertisements in games", Chalil et al., Proceedings of 2003 international conference on Multimedia and Expo, Jul. 6-9, 2003, pp. 413-416.
Chinese Office Action issued in corresponding Chinese patent application 201210191819.1 dated Jul. 29, 2014, (19 pages).
Chinese search report issued in corresponding Chinese patent application 201210191819.1 dated Jul. 21, 2014 [w/English translation] (4 pages).

* cited by examiner

DYNAMIC INSERTION OF PERSONALIZED CONTENT IN ONLINE GAME SCENES

BACKGROUND

In an online video gaming system a game-user/player may freely download games from a game provider's web site. The downloaded game may be a modified or "stripped-down" version of a game designed to acquaint the game-user with the game's features and to encourage the game-user to purchase the complete version. In one respect the downloaded version or stripped-down version of the game may be considered a "loss-leader." In other words the game provider may initially lose money in providing a freely downloadable modified game with the expectation that the loss will be more than offset when the game-user decides to purchase the complete version of the game.

The game provider may also employ a remote game server to provide media content to the game-user such as a 2-D game scene. In addition, the game software may be designed to export client terminal information (such as information regarding the registration status of the game-user) to the game server. Some of the media content provided by the game server may include content that the game-user's client terminal can update with user-specific data, such as game character attributes (e.g., a game character's name, etc.). Although the media content may be modified by the client terminal the media content may not be personalized by the game server because any game-user/player interacting with the game server and providing the same user data to the game server (e.g., the registration status of the game-user) will receive the same media content regardless of the game-user's personal attributes, such as the game-user's geographical location and/or the game-user's time zone. Thus the game server may not be able to stream media content such as advertising content personalized for consumption by a specific game-user.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art, having the benefit of the present disclosure, that the various aspects of the invention claimed may be practiced in other examples that depart from these specific details. In certain instances, descriptions of well known devices, circuits, and methods are omitted so as not to obscure the description of the present invention with unnecessary detail.

Figure 1:
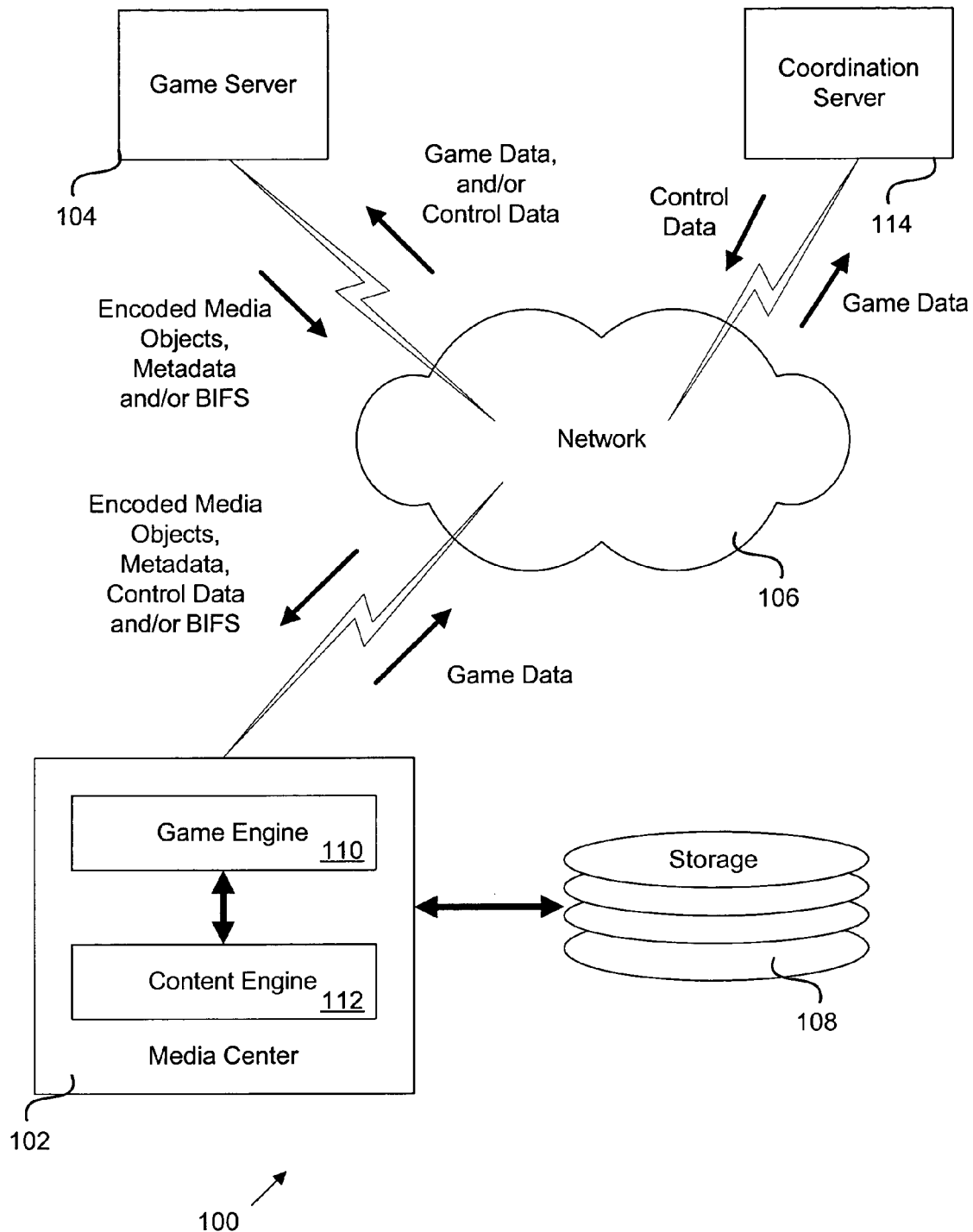
FIG. 1 illustrates an example system.

FIG. 1 illustrates an example system 100 according to one implementation of the invention. System 100 may include a media center 102, a game server 104, a network 106 and storage 108. Media center 102 may include a game engine 110 and a content engine 112. System 100 may also include a coordination server 114. Although the following description of system 100 may be in the context of an online gaming system utilizing MPEG4-compatible streaming media object distribution and/or coding schemes and MPEG4-compatible encoding and/or decoding apparatus, the invention is not limited in this regard and other existing and/or to-be-developed media distribution and/or coding schemes consistent with the present invention are contemplated by the present invention.

Media center 102 may be communicatively coupled through network 106 to game server 104 and may provide data and/or game metadata to game server 104 over network 106. Although media center 102 may be embodied in a single device, such as a single integrated circuit (IC) system on a chip (SOC), in some implementations certain components of media center 102 may be remote and/or physically separated from other components of media center 102. For example, in other implementations, media center 102 may comprise two or more physically distinct ICs or two or more ICs interconnected and packaged together. Furthermore, although media center 102 may comprise discrete components, some components may be implemented in hardware, software/firmware, or some combination thereof.

Game server 104 may include and/or may be communicatively coupled to a source of game content (not shown). Although, as illustrated, game server 104 may comprise a single content server, such as a web server, in other implementations game server 104 may comprise two or more content serving devices arranged to provide game content to other devices, such as media center 102, coupled to network 106. Game server 104 may provide game content in the form of MPEG4-compatible encoded media objects to other devices, such as media center 102, coupled to network 106, although the invention is not limited in this respect. The encoded media objects provided and/or streamed by game server 104 may, for example, comprise encoded still or video image objects and/or encoded audio objects although the invention is not limited in this regard. Game server 104 may provide such encoded game content and/or media objects in response to data and/or game metadata received over network 106 from other devices coupled to network 106, such as media center 102.

In some implementations, game server 104 may provide static media objects to media center 102. Static media objects may be media objects that are designated and/or specified to be replaced by dynamic media objects also provided by game server 104. In particular, although the invention is not limited in this regard, game server 104 may provide static media objects in addition to other media objects to media center 102 when a game-user/player using media center 102 first downloads and/or otherwise obtains game software from game server 104 and/or from another server (not shown).

Network 106 may be any content delivery network capable of routing data and/or game metadata from and/or game content and/or encoded media objects between game server 104 and media center 102. For example, although the invention is not limited in this regard, network 106 may comprise the internet or world-wide-web and all local sub-networks required to couple game server 104 and media center 102 to the internet. Although media center 102 and/or game server 104 may be coupled to network 106 through wired communications infrastructure, the invention is not limited in this regard and in some implementations media center 102 and/or game server 104 may be coupled to network 106 through wireless communications infrastructure.

Storage 108 may be communicatively and/or operatively coupled to media center 102 to provide storage for encoded and/or decoded media objects received from game server 104. Storage 108 may comprise one or more suitable integrated drive electronics (IDE) drives, such as a hard disk drive (HDD) or optical disc drive (e.g., CD-ROM, CD-R/W, DVD-R, DVD-R/W, etc.), to name a few possibilities.

Content engine 112 may comprise hardware, software, firmware or any combination thereof capable of interacting with game server 104, game engine 110 and storage 108 in the manner to be described below. Content engine 112 may decode streams of encoded media objects received from game server 104, compose the decoded media objects into composite game scenes and supply the resulting composite game scenes to game engine 110. Content engine 112 may also facilitate interaction with both storage 108 to store encoded and/or decoded media objects and/or retrieve encoded and/or decoded media objects from storage and game server 104 to communicate game data to game server 104. All of these functions will be discussed in more detail below.

In some implementations, content engine 112 may provide game data to game server 104 when media center 102 and/or content engine 112 communicates with game server 104 over network 106. For example, although the invention is not limited in this regard, a game-user/player using media center 102 and wishing to play an online game may establish communication with game server 104 and, in so doing, content engine 112 may provide game data to game server 104. The game data may include personalized data or attributes such as the game-user/player's game profile, the game-user/player's game playing habits, the game-user/player's local time, etc. In response to the received game data, game server 104 may provide one or more dynamic media objects to content engine 112 and, in turn, content engine 112 may replace one or more static media objects with the one or more dynamic media objects.

Game engine 110 may comprise hardware, software, firmware or any combination thereof capable of implementing game play. Game engine 110 may perform several functions including, but not limited to, running local game software facilitating user/player interaction and/or game play with a game environment and/or rendering composite game scenes received from content engine 112 in response to game control parameters retrieved from storage 108.

Coordination server 114 may include and/or may be communicatively coupled to a source of game coordination data (not shown). Although, as illustrated, coordination server 114 may comprise a single server, such as a web server, in other implementations coordination server 114 may comprise two or more server devices, such as web servers, arranged to provide coordinating data and/or control data to other devices, such as media center 102 and/or game server 104, coupled to network 106. Although illustrated as physically distinct from game server 104, in other implementations, coordination server 114 and game server 104 may be embodied within a single server, although the invention is not limited in this respect.

Coordination server 114 may provide control data to game server 104 to specify which content and/or media objects game server 104 should provide to media center 102, although the invention is not limited in this respect. Coordination server 114 may provide such control data in response to game data received over network 106 from other devices coupled to network 106, such as media center 102. In addition, coordination server 114 may be coupled, via network 106, to one or more additional media centers (not shown) and may provide control data to game server 104 specifying what media objects game server 104 should send to those additional media centers. Coordination server 114 may provide control data specifying content for media center 102 and/or additional media centers in response to game data received from media center 102 and/or in response to game data received from those additional media centers.

Figure 2:
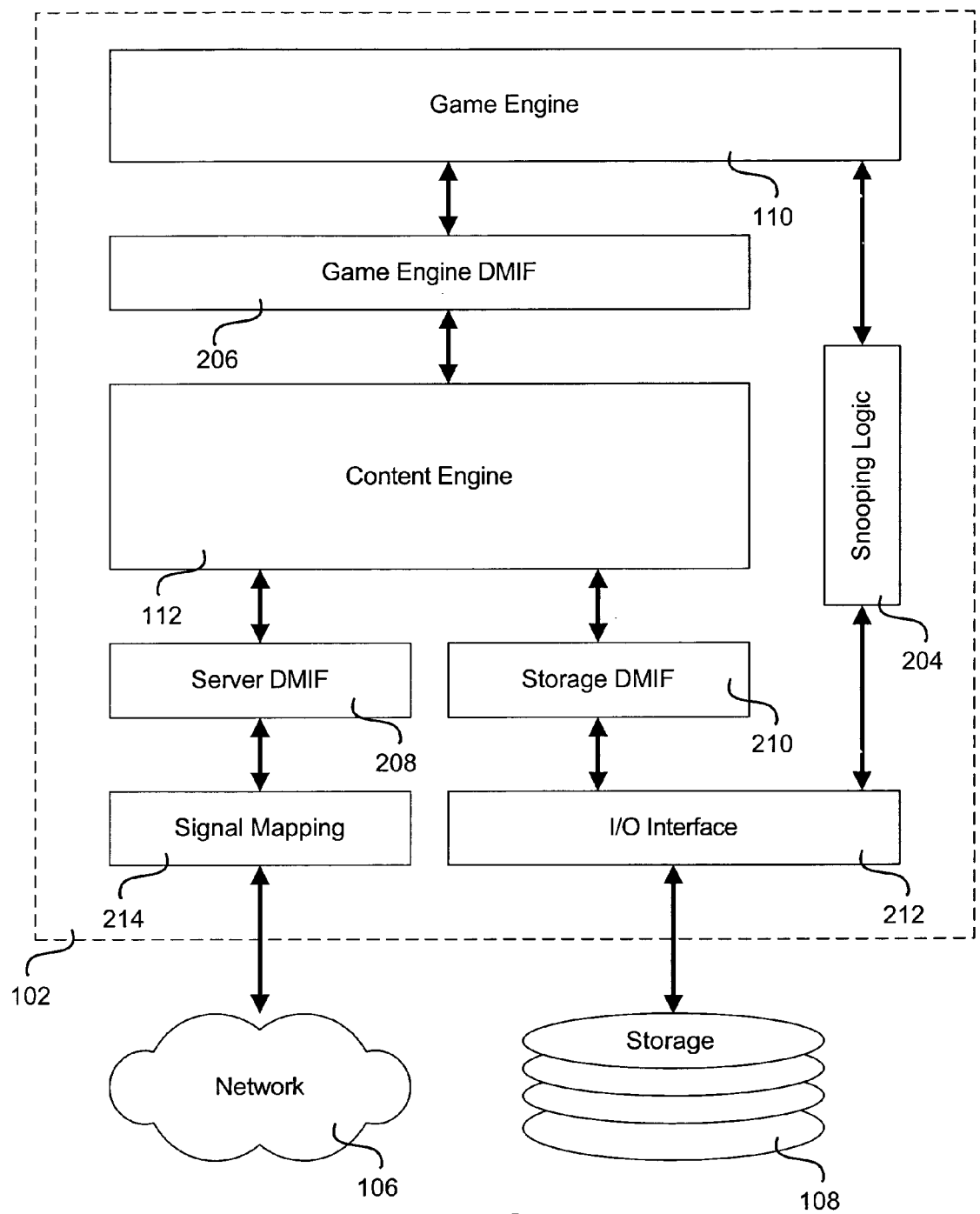
FIG. 2 illustrates some components of the system of FIG. 1 in more detail.

FIG. 2 illustrates media center 102 and some other components of the system 100 of FIG. 1 in more detail. In addition to game engine 110 and content engine 112, media center 102 may include snooping logic 204. As illustrated, content engine 112 may be compatible with the MPEG4 media coding scheme and/or protocol although the invention is not limited in this regard.

In addition, media center 102 may implement and/or support several layers and/or portions of layers of MPEG4-compatible delivery multimedia integration framework (DMIF) software to provide a uniform transport interface between content engine 112 and other components of system 100. MPEG4 DMIFs are well known in the art and a more detailed description of their function and/or structure is omitted herein in order not to unnecessarily obscure implementations of the present invention.

Media center 102 may include a game engine DMIF 206 to enable the communication and/or streaming of, for example, game scenes including decoded media objects from content engine 112 to game engine 110. Media center 102 may also include a storage DMIF 210 to enable the communication of, for example, I/O interface 212 and/or encoded and/or decoded media objects and/or game data from content engine 112 and/or game engine 110 to and/or from storage 108.

Media center 102 may further include a server DMIF 208 to enable the communication and/or streaming of, for example, encoded media objects from network 106 to content engine 112 and/or the communication of game data from content engine 112 to network 106. Media center 102 may include signal mapping functionality 214 to enable proper routing of signals including, for example, game data from server DMIF 208 over network 106 to game server 104 and/or coordination server 114. Signal mapping 214 may be provided by hardware, software, firmware or any combination thereof.

Snooping logic 204 may be provided by hardware, software, firmware or any combination thereof capable of permitting game engine 110 to extract game control parameters from storage 108, using I/O interface 212, as needed to allow game engine 110 to update game data such as the game-user's profile although the invention is not limited in this regard. Although illustrated as being external to game engine 110, in some implementations snooping logic 204 may be internal to game engine 110 although the invention is not limited in this regard. The functionality of snooping logic 204 will also be discussed in more detail below.

Figure 3:
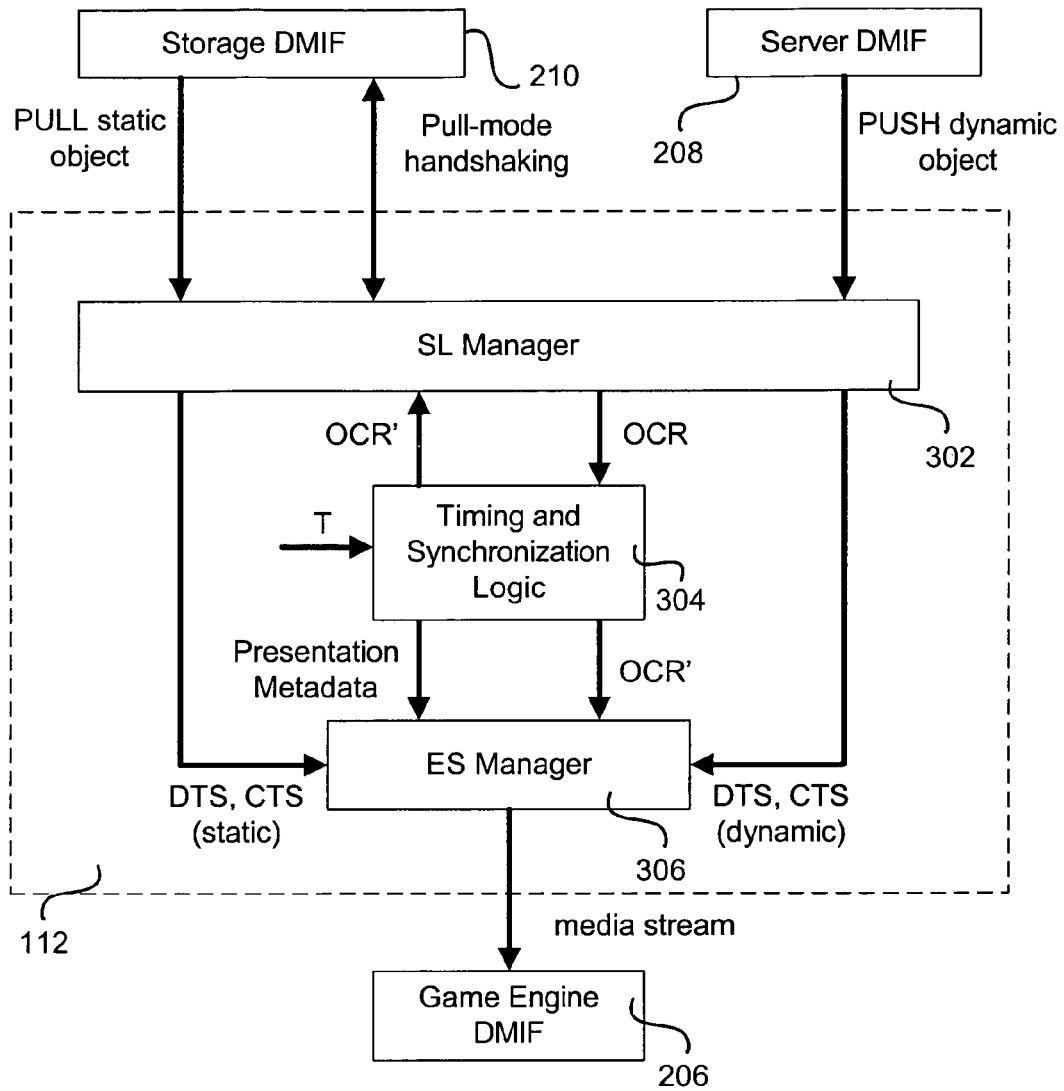
FIG. 3 illustrates some components of system of FIGS. 1 and 2 in more detail.

FIG. 3 illustrates some components of media center 102 and content engine 112 of FIGS. 1 and 2 in more detail. In one implementation, content engine 112 may include a synchronization layer (SL) manager 302, timing and synchronization logic (TSL) 304 and an elementary stream (ES) manager 306. Although illustrated as separate components, in other implementations SL manager 302 and TSL 304 may be implemented within one component, although the invention is not limited in this regard. Similarly, although SL manager 302 and ES manager 306 are illustrated as separate components in FIG. 3, in other implementations SL manager 302 and ES manager 306 may be implemented as a single component although, again, the invention is not limited in this regard. In addition, SL manager 302, TSL 304 and/or ES manager 306 may be provided by hardware, software, firmware or any combination thereof.

Figure 4:
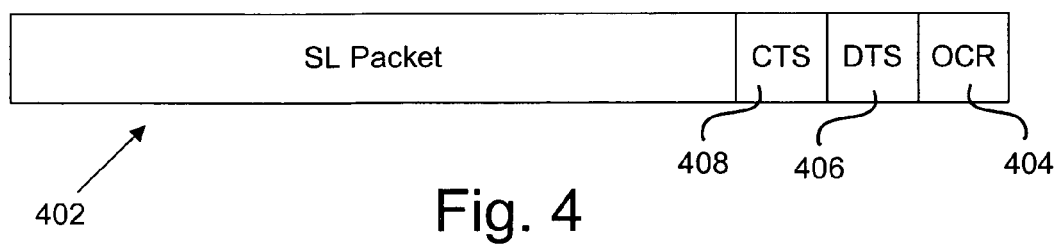
FIG. 4 illustrates an example data packet.

FIG. 4 illustrates an example synchronization layer (SL) packet 402 that may include header information specifying timing parameters such as MPEG4-compatible time stamps, although the invention is not limited in this regard. In some implementations, SL packet 402 may include three time stamps: an object reference clock (OCR) 404 time stamp that may represent a master time base for system 100 and that may be used to reconstruct a time base for an associated object: a decoding time stamp (DTS) 406 that may specify a time, referenced to the OCR time stamp, at which to decode an associated encoded media object; and a composition time stamp (CTS) 408, also referenced to the OCR time stamp, that may specify a time at which the ES manager 306 should render a decoded media object.

Referring now to FIGS. 1-4, SL packet 402 may be associated with an encoded media object such as an encoded media object streamed by game server 104. Game server 104 may provide and/or stream SL packet 402 to media center 102 along with one or more associated encoded media objects.

In some implementations, SL manager 302 may implement and/or support one or more layers and/or portions of layers software compatible with the MPEG4 flextime protocol and/or scheme. Such flextime-compatible software may permit SL manager 302 to utilize, process and/or modify OCR, DTS and CTS time stamps associated with one or more media objects as will be described in more detail below. The MPEG4 flextime protocol and/or scheme is well known in the art and more detailed description of flextime function and/or structure is omitted herein in order not to unnecessarily obscure implementations of the present invention.

In some implementations, SL manager 302 may implement and/or support one or more layers and/or portions of layers software compatible with the MPEG4 flexmux protocol and/or scheme. Such flexmux-compatible software may permit SL manager 302 to de-multiplex streams of encoded media received from game server 104 via network 106 and server DMIF 208 to yield de-multiplexed media objects as will be described in more detail below. In addition, SL manager 302 may use the flexmux-compatible software to de-multiplex streams of encoded media objects provided by storage DMIF 210 as will be described in more detail below. The MPEG4 flexmux protocol and/or scheme is well known in the art and more detailed description of flexmux function and/or structure is omitted herein in order not to unnecessarily obscure implementations of the present invention.

In some implementations, SL manager 302 may utilize storage DMIF 210 to pull static objects from storage 108 and may provide those static objects and/or DTS and CTS time stamps associated with those static objects to ES manager 306 as will be described in more detail below. In addition, SL manager 302 may, in response to dynamic objects provided by game server 104 and pushed by server DMIF 208, provide DTS and CTS time stamps associated with those dynamic objects to ES manager 306 as will be described in more detail below. SL manager 302 may pull the static objects in response to information and/or metadata provided by and/or associated with a dynamic object pushed by game server 104.

In some implementations, TSL 304 may utilize OCR time stamps provided by SL manager and associated with one or more media objects to generate synchronization data such as presentation metadata. In some implementations, TSL 304 may modify flextime parameters to compensate for small temporal drifts due to delay and/or jitter associated with network 106 as determined by temporal fluctuations in the OCR time stamps with respect to a local time base. TSL 304 may provide the presentation metadata to ES manager 306 to enable ES manager 306 to compose game scenes. In addition, TSL 304 may compare OCR time stamps received from SL manager 302 to a local time base, generate a modified OCR' time stamp in response to that comparison, and provide the modified OCR' time stamp to ES manager 306. In some implementations, TSL 304 may compare the OCR time stamps to a timing signal T provided, for example, by an internal clock signal generator (not shown).

In some implementations, TSL 304 may generate pull primitives and/or pull indicators in response to comparing the OCR time stamps to the local time base and may provide those pull primitives and/or pull indicators to SL manager 302 along with the modified OCR' time stamps. In response to the pull primitives and modified OCR' time stamps received from TSL 304, SL manager 302 may indicate to storage DMIF that one or more static media objects should be pulled from storage 108 and provided to SL manager 302.

In some implementations, ES manager 306 may implement and/or support one or more layers and/or portions of layers of flextime-compatible software. Such flextime software may permit ES manager 306 to utilize, process and/or modify the OCR, DTS and CTS time stamps associated with one or more media objects as will also be described in more detail below. For example, ES manager may modify the DTS and/or CTS time stamps associated with static media objects to temporally match the DTS and/or CTS time stamps associated with dynamic media objects.

In response to the OCR' time stamps provided by TSL 304 and the DTS/CTS time stamps provided by SL manager 302 as well as the presentation metadata provided by TSL 304, ES manager 306 may compose and/or multiplex a stream of game scenes and supply that media stream to game engine DMIF 206 for delivery to game engine 110. The composed game scenes may incorporate dynamic media objects swapped for static media objects supplied through storage DMIF 210. The composed game scenes may also incorporate additional media objects supplied through server DMIF 208. In particular, in response to the time stamps provided by both SL manager 302 and TSL 304, ES manager 306 may replace one or more static objects provided by ES manager 306 with one or more dynamic objects as will be described in further detail below.

In addition to streaming encoded media objects associated with one or more SL packets 402, game server 104 may also, in some implementations, stream one or more SL packet specifying MPEG4-compatible binary information for scenes (BIFS) data. The streamed BIFS may inform content engine 112 of the spatial and temporal location of each media object in a game scene. MPEG4 BIFS are well known in the art and more detailed description of their function and/or structure is omitted herein in order not to unnecessarily obscure implementations of the present invention.

In response to one or more BIFS, content engine 112, in particular ES manager 306, may compose an associated game scene and provide that scene to game engine 110 through game engine DMIF 206. In particular, in some implementations, a BIFS associated with a dynamic object may specify that ES manager 306 should replace one or more static objects with one or more dynamic objects when composing a particular game scene as will be described in more detail below.

Figure 5:
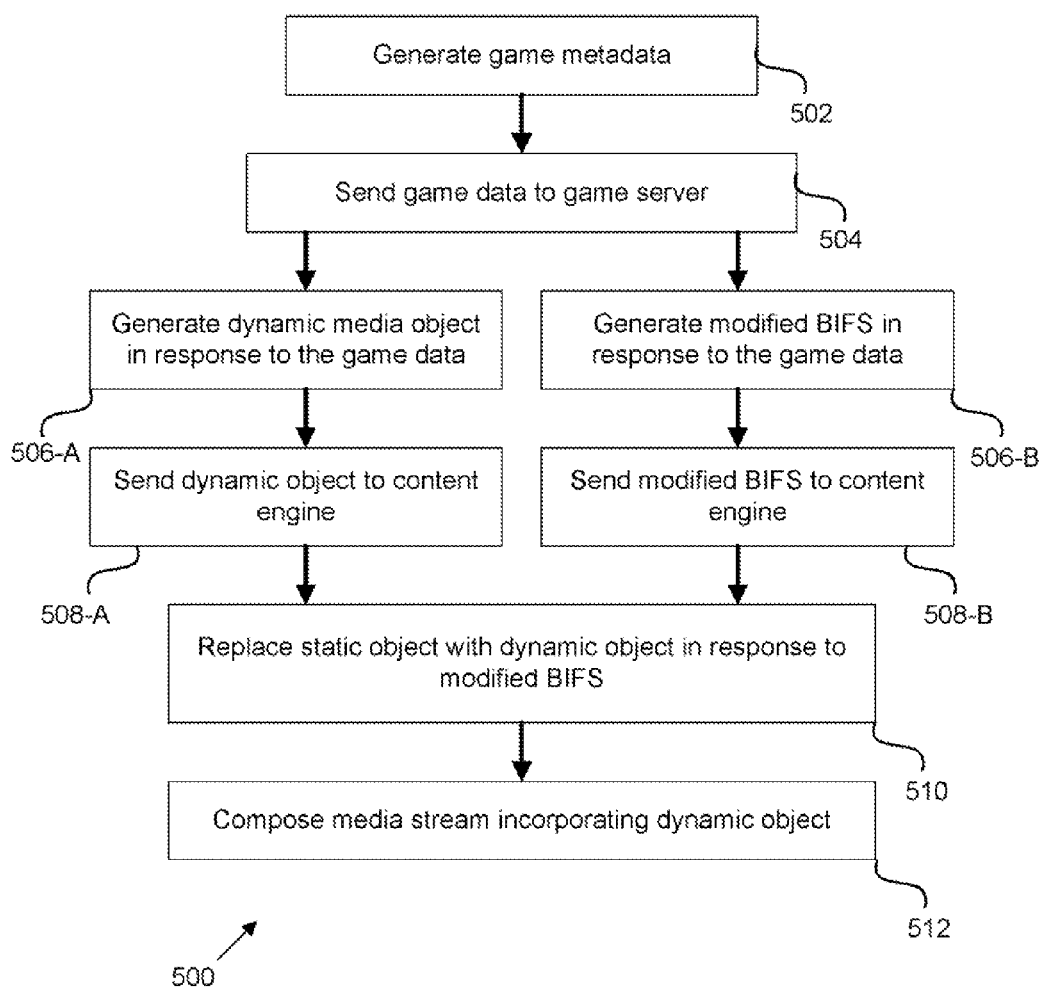
FIG. 5 is a flow chart illustrating an example process of replacing static media objects with dynamic media objects.

FIG. 5 is a flow chart illustrating a process 500 of replacing static media objects with dynamic media objects. Although process 500, and associated processes, may be described with regard to system 100 of FIG. 1 and components of system 100 as illustrated in FIGS. 2 and 3 for ease of explanation, the claimed invention is not limited in this regard. In addition, although FIG. 5 may be described in the context of a game-user/player playing a free online game where an online gaming service provides streaming game content to the user/player through game server 104 and system 100, the invention is not limited in this regard.

Processing may begin by generating game data to reflect game-user/player specific data such as the player's local time and/or some aspect of the player's profile such as the player's age or game level [act 502]. One way to do this is by having media center 102 generate the game data. Specifically, game engine 110 may generate the game data and supply that game data to content engine 112. In some implementations, a game-user/player may first download and/or obtain free online game software including static media objects from a game provider. One way to do this would be to download the game software using media center 102, although the invention is not limited in this respect. In some implementations, the downloaded static media objects may be stored in storage 108. In some implementations, the static objects stored in storage 108 may be associated with time stamps, for example, static DTS and/or CTS time stamps. The game-user/player may then establish communication via a network with a game server that may be distinct from the game provider. One way to do this may be to establish communication over network 106 with game server 104 using media center 102 and/or content engine 112.

Process 500 may continue by sending the game data to a game server [act 504]. This may be accomplished by content engine 112 sending the game data to game server 104 over network 106. In other implementations, however, game engine 110 may send the game data to game server 104. In some implementations, content engine 112 may obtain game data stored in storage 108 using storage DMIF 210 and provide that game data to game server 104 using server DMIF 208. In some implementations, the game data stored in storage 108 may be updated and/or modified using game parameters obtained from game engine 110 using snooping logic 204. For example, when a game-user/player is winning a game, snooping logic 204 may update and/or modify the game data stored in storage 108 to reflect this.

Processing may continue with game server 104, or a game content generating component (not shown) coupled to game server 104, generating and/or providing a dynamic media object in response to the game data [act 506-A]. In some implementations, such a dynamic object may comprise personalized advertising generated in response to the game data, although the invention is not limited in this regard. Game server 104, or a game content generating component coupled to game server 104, may also generate a modified BIF [act 506-B] associated with the dynamic media object generated in act 506A. Game server 104 may send the dynamic media object and modified BIFS to media center 102 [acts 508-A and 508-B respectively].

In some implementations, coordination server 114 may, in response to the game data, provide control data to game server 104 specifying which dynamic media objects it should supply to content engine 112. Coordination server 114 may do so in response not only to game data received from media center 102 but also in response to game data received from one or more additional media centers (not shown) that are also coupled to game server 104 through network 106. For example, although the invention is not limited in this regard, multiple game-users/players using media center 102 and one or more additional media centers may use game server 104 to play a multi-player online game. Coordination server 114 may then provide coordination for the multi-player online game by, for example, incorporating and/or tracking the actions of the multiple game-users/players as provided by multiple game-users/players' respective game data and, in response, providing control data to game server 104.

By communicating with multiple game-users/players and coordinating the content provided by game server 104, coordination server 114 may enable system 100 to provide dynamic content personalized to each one of the multiple game-users/players. For example, a game-user/player that is losing the multi-player online game may receive different dynamic content than a game-user/player that is winning the multi-player online game.

In some implementations, processing may continue by replacing a static object with the dynamic object as specified by and in response to the modified BIFS [act 510]. One way to do this is by having ES manager 306 of content engine 112 replace a static object specified by the modified BIFS with a dynamic object associated with and/or specified by the modified BIFS. For example, the modified BIFS may specify that SL manager 302 provide a specific static object associated with a particular OCR time to ES manager 306. More specifically, although the invention is not limited in this regard, the OCR time stamp of the SL packet 402 associated with the dynamic object may be modified by TSL 304 and the modified OCR' supplied to SL manager 302. SL manager 302 may then instruct storage DMIF 210 to pull one or more static objects in response to the OCR' time stamp. SL manager 302 may then provide the static object and its associated DTS and CTS time stamps to ES manager 306. In some implementations, ES manager 306 may then modify the static objects' DTS and CTS time stamps in response to the OCR' time stamps provided by TSL 304 to match the DTS and CTS time stamps of the dynamic object. ES manager 306 may then swap and/or replace the static media object with the dynamic media object.

Processing may proceed with the incorporation of the dynamic media object along with other objects into a stream of objects representing a game scene [act 512]. In some implementations, this may be done by ES manager 306 incorporating and/or composing the dynamic media object with other media objects obtained from either storage 108 and/or game server 104 into a single multimedia object stream. In some implementations the multimedia object stream produced by ES manager 306 may be an MPEG4 media object stream, although the invention is not limited in this regard.

The acts shown in FIG. 5 need not be implemented in the order shown; nor do all of the acts necessarily need to be performed. Also, those acts that are not dependent on other acts may be performed in parallel with the other acts. In addition, process 500 may be repeated one or more times during the course of playing an online game thereby permitting personalized content to be inserted into multiple online game scenes. Further, at least some of the acts in this figure may be implemented as instructions, or groups of instructions, implemented in a machine-readable medium.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention.

For example, the system, apparatus and methods for dynamically inserting personalized content in online gaming scenes described herein are not limited to systems or apparatus which use MPEG4-compatible media objects. Rather, the claimed invention also contemplates other protocols capable of supporting the dynamic insertion of personalized content in online gaming scenes. Also, although described in terms of using external storage 108 to store static objects, in some implementations static objects may be stored in storage and/or memory internal to media center 102. For example, static object storage may be provided by memory embedded within content engine 112 and/or game engine 110. Clearly, many other implementations may be employed to provide for the dynamic insertion of personalized content in online gaming scenes Consistent with the claimed invention.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:
   having a media center including a content engine to generate game data;
   providing the game data to a game server over a network;
   providing dynamic content for a plurality of users over the network, from said game server to said media center, in response to the game data specifying at least one game user attribute;
   replacing static content with dynamic content at at least one time specified by at least one time stamp;
   rendering the dynamic content using a game engine,
   wherein the dynamic content is personalized in response to the at least one game user attribute, and
   wherein the dynamic content includes personalized advertising content.

2. The method of claim 1 wherein the at least one time stamp comprises at least one MPEG4-compatible time stamp.

3. The method of claim 1 wherein replacing further comprises substituting the dynamic content for static content specified by the content server.

4. An apparatus comprising:
   a game engine; and
   a content engine coupled to the game engine,
   the content engine to:
   replace at least one static media object with at least one dynamic media object received from a game server at least partly in response to at least one time stamp associated with the at least one dynamic media object; and
   provide the at least one dynamic media object to the game engine
   wherein the dynamic media object is provided in response to game data specifying at least one game user attribute,
   wherein the dynamic content is personalized in response to the at least one game player attribute, and
   wherein the dynamic content includes personalized advertising content.

5. The apparatus of claim 4, further comprising:
   logic capable of modifying, in response to the at least one time stamp associated with the at least one dynamic media object, at least one time stamp associated with the at least one static media object to generate at least one modified time stamp.

6. The apparatus of claim 5, wherein the content engine further comprises:
   an elementary stream manager capable of swapping the at least one dynamic media object received for the at least one static media in response to the at least one modified time stamp.

7. The apparatus of claim 4, wherein the at least one time stamp comprises at least one MPEG4-compatible time stamp.

8. A system comprising:
   a content engine capable of generating game data specifying one or more attributes of a game-user;
   storage coupled to the content engine, the storage to store static media content; and
   a web server coupled to the content engine, the web server capable of storing information including dynamic media content,
   the web server further capable of streaming the dynamic media content to the content engine in response to the game data specifying the one or more attributes of the game-user, wherein the content engine is further capable of substituting the dynamic media content for the static media content,
   wherein the dynamic media content includes content personalized in response to the one or more attributes of the game-user, and
   wherein the dynamic media content personalized in response to the one or more attributes of the game-user includes advertising content.

9. The system of claim 8, further comprising:
   a game engine coupled to the content engine, the game engine capable of rendering the dynamic media content.

* * * * *